J. E. BIGGINS.
PROCESS OF DISTILLING OIL.
APPLICATION FILED OCT. 23, 1917.
1,274,976.
Patented Aug. 6, 1918.
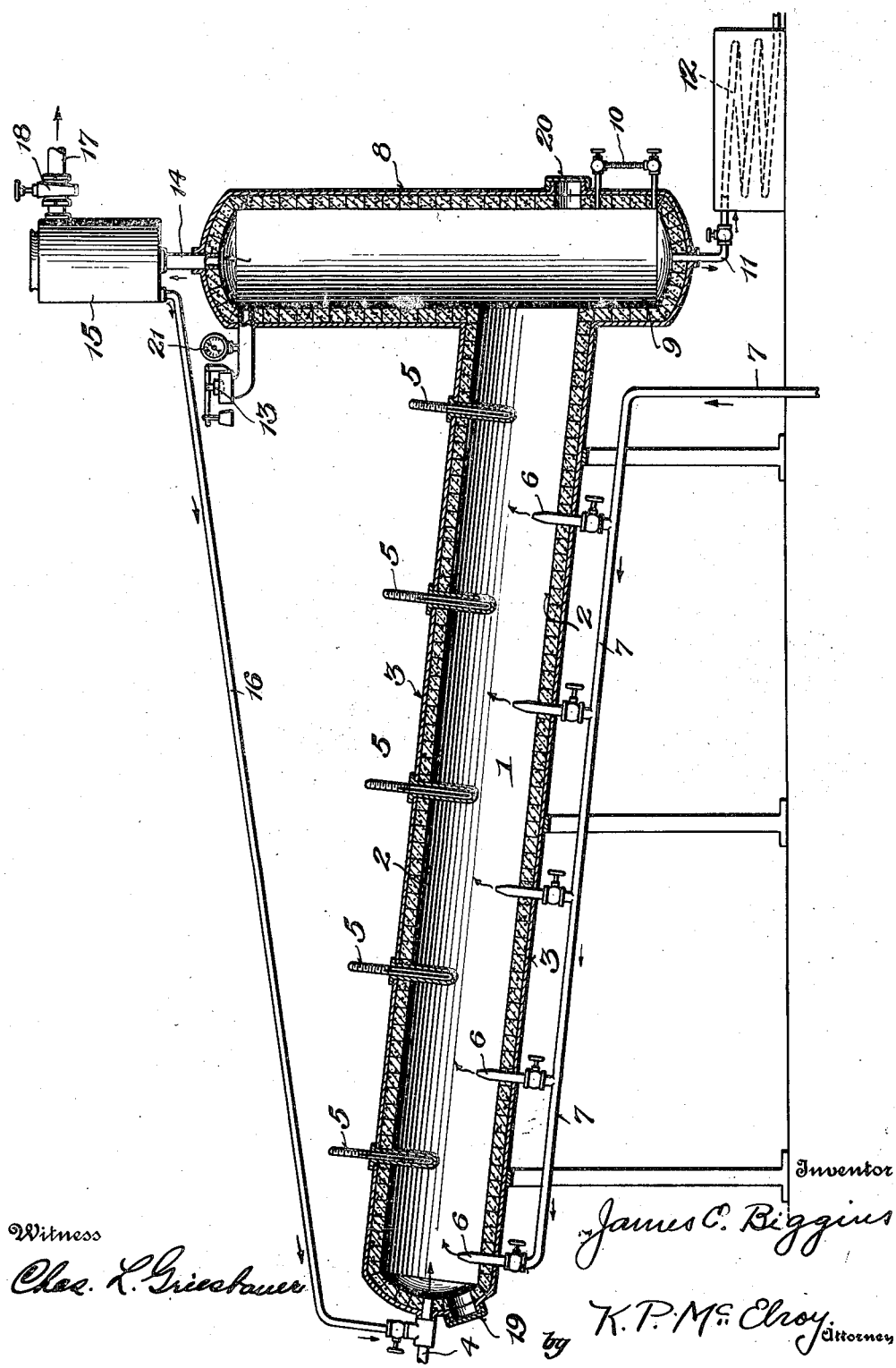
Witness
Chas. L. Gieshauer
Inventor
James C. Biggins
by K. P. McElroy
Attorney

UNITED STATES PATENT OFFICE.

JAMES E. BIGGINS, OF PORT ARTHUR, TEXAS, ASSIGNOR TO GULF REFINING COMPANY, OF PITTSBURGH, PENNSYLVANIA, A CORPORATION OF TEXAS.

PROCESS OF DISTILLING OIL.

1,274,976.      Specification of Letters Patent.      Patented Aug. 6, 1918.

Application filed October 23, 1917. Serial No. 198,132.

*To all whom it may concern:*

Be it known that I, JAMES E. BIGGINS, a citizen of the United States, residing at Port Arthur, in the county of Jefferson and State of Texas, have invented certain new and useful Improvements in Processes of Distilling Oil, of which the following is a specification.

This invention relates to processes of distilling oil; and it comprises a method of performing what is known as a cracking distillation of petroleum oils at a high temperature, wherein such temperature is generated in the presence of the oil itself, or of its vapors, by a regulated introduction of air, high boiling oil being caused to flow into and through a highly heated unobstructed conduit or passage communicating at the end opposite the end where the oil is introduced with suitable devices for removing and condensing vapors and for recovering volatile products of reaction carried away with escaping gases, said conduit being provided at one or more points along its length with means for introducing air in small quantity to maintain the heat in said passage, said devices for condensing escaping vapors advantageously including air cooled means for condensing and recovering high boiling oils for repassage through the heated passage or reaction chamber; all as more fully hereinafter set forth, and as claimed.

In the manufacture of gasolene by the various cracking processes from heavier and higher boiling oils, such as kerosene, gas oil or solar oil, crude oils, still residues, etc., the oils are heated, either as vapors or as liquids, to a temperature which is higher than those prevailing in normal distillation; say, temperatures above 600° F. Pressure is often employed. Under these circumstances the heavier or higher boiling oils crack down into lower boiling, furnishing "cracked" products; that is, gasolene or kerosene, or, and usually, a mixture of both. This heating is a difficult and expensive operation, and particularly where pressure is employed, since with pressure naturally the walls of the still must be thicker and less conductive for heat; the difficulty being accentuated by the fact that carbon always deposits and usually bakes on the still wall, much impeding transmission of heat and making the stills short-lived.

In the present invention I obviate these heating difficulties by the simple expedient of feeding in a little air to the cracking zone, thereby keeping up the temperature by the development of heat of oxidation internally. The cracking temperatures are high enough to permit free development of heat by aerial oxidation or combustion. Stated in one way, instead of keeping up the temperature within the still by burning oil outside, I burn a little of the oil inside with the net result of an economy in oil. In so doing, the walls of the still, instead of being of heat-permeable metal, may of course be brick lined and insulated against loss of heat. The introduction of air, and consequent development of heat, may be at one point or several; but in practice I prefer introduction at a plurality of points in the channel through which the oil and oil vapors flow, thereby keeping a substantially uniform temperature throughout. Since the present invention relates to a cracking process rather than to ordinary distillation, it is desirable that the temperature throughout the passage of the oil shall be high. Should any difference of temperature at different parts of the still be desired along the length of the passage through which oil flows, it may of course be provided by properly adjusting the air feed at different points.

The oil or oil vapors unite with the oxygen of the air to form products of combustion ($H_2O$, $CO$ and $CO_2$) which pass forward with the residual nitrogen. The presence of the stream of gases going through affects the operation more or less. In part, the action is analogous to the action of steam in facilitating the distillation or vaporization of high boiling oils. For this reason, it is generally desirable, and also because of other reasons, to include in the system an air-cooled condenser capable of condensing and collecting such high boiling oils as may go beyond the cracking zone and of conducting the collected high boiling oils back to the cracking zone. There are of course provided also the usual water-cooled condensers for collecting the cracked products formed. With the air-cooled condenser between the cracking zone and the water-cooled condenser and with a return of the condensate caused by air-cooling, the product is, or may be, motor fuel of the nature of gasolene.

The particular character of the motor fuel will depend upon the adjustment of conditions in the air-cooled condenser. Motor fuels of any desired end boiling point may be produced. The inert gases passing beyond the water-cooled condenser carry more or less uncondensed gasolene vapors with them and it is usually desirable to scrub the issuing gases with a heavy oil. Absorbed gasolene may be recovered from the heavy oil in the usual way. Or the heavy oil used in the scrubbing may be that which is to be used for cracking and after use in the scrubber, the oil may go to the cracking zone, taking with it absorbed gasolene.

In the accompanying illustration I have shown, more or less diagrammatically, in central vertical section, an apparatus within the purview of the present invention and adapted for use in the performance of the described process. In this showing—

Element 1 is a cracking device or cracker shown as a cylindrical inclined apparatus. The inclination may of course be greater or less, or the apparatus may even be vertical. As shown it is lined with brick 2 and has an outer steel casing 3 which may be further heat insulated if desired. At the upper end is an oil inlet 4 connected to a source of oil not shown. If the apparatus is to run under pressure, this oil may be introduced under such pump pressure as may be desired. Passing through the upper wall of the cracking device are a plurality of thermometers, pyrometers or thermostatic devices 5. If these be thermostatic devices, they may be connected to and control the source of air in order to keep a regulated temperature within the cracking device. Passing through the lower wall of the devive are a plurality of air-injecting nozzles 6, shown as rising somewhat above the lower wall. These are suitably valved and are connected to airline 7 leading to a source of air under pressure (not shown). At the lower end the cracking device communicates with a brick lined vertical tower 8 which serves as a collecting drum and to some extent as an air cooled condenser. Generally the temperature in this towerlike device is such as to permit only deposition of tar and carbon. The tower is prolonged downward to form a well or sump 9 in which the level of accumulated liquid can be seen by gage glass 10. At its base is valved draw-off 11 connected to cooling coil 12. The tower is provided with a safety valve 13. At the top the tower connects through conduit 14 with diagrammatically shown air-cooled condenser, or run-back 15. From this run-back, conduit 16 is provided for returning condensed high boiling oil back for re-introduction. As shown, it connects with the oil inlet. The air-cooled condenser has vapor outlet 17 connecting with the usual water-cooled condensers (not shown). There may be a valve in this vapor conduit as indicated at 18 or there may be a valve beyond the condensers. Cleaning outlet or manhole 19 is provided at the upper end of the cylindrical cracking device and there may be a corresponding manhole 20 opposite it in the towerlike device.

The operation of the above structure is believed to be clear from the foregoing. Heavy oil of any desired character is introduced at 4 under such pressure as may be desired. The oil introduced may be any heavy oil. It may be kerosene to be cracked into gasolene or it may be solar oil or gas oil to be cracked into gasolene or into a mixture of gasolene and kerosene as the case may be. Or it may be any desired petroleum material, a crude oil, a residuum of distillation or a distillate. In the present invention, all characters of oil may be readily handled, even those oils which are so rich in carbon as to give a copious separation of coke by ordinary distillation methods. Accumulation of coke in the present device does not in any way injure it, since there is usually no heating through the walls. If coke accumulates the supply of oil is shut off and the coke simply burnt out by continuing the introduction of air. Heavy viscous oils holding considerable water may be readily handled under the present invention.

Any desired pressure may be maintained within the apparatus, this pressure being indicated by gage 21. In the structure of the present apparatus, since heating through the walls is not necessary and the outer wall may be kept cool enough to take advantage of the strength of cold steel, relatively enormous pressures may be readily employed. But ordinarily I do not aim to go over a pressure of 100 to 200 pounds and I may work at much lower pressures.

The oil going in at 4 is vaporized, wholly or in part, by the heat within the cracking device; and since it enters suddenly into a zone of high heat, the vaporization may take place in a disruptive way, atomizing any oil not vaporized. Whether vaporized or atomized or remaining more or less in a liquid condition, the oil passes downward through 1 flowing along the lower wall. As it goes, a certain amount of combustion of oil vapors and gases takes place at each of air inlets 6, keeping up the temperature. Residual gases and vapors and oil flow downward into tower 8. Here the temperature is still high and any suspended tar and carbon settle out and fall into sump 9 whence they are removed continuously or from time to time through 11. The mixture of uncondensed vapors and gases goes forward through 14 into 15 where high boiling oil is condensed, collected and returned through 16 to the point of inlet 4. Uncondensed vapors and gases pass forward through 17 to the condenser. The character of these vapors of course depends upon the amount of cooling given in 15. If 15 is kept at such a temperature that the vapors going through 17 are not above 300-350° F., the product recovered from the final condensers will be commercial gasolene, since the kerosene fraction will be collected and returned through 16 to the cracking zone. If the vapor temperature is 400° F. or thereabout, the final condenser will collect a mixture of gasolene and kerosene which may be subsequently separated by ordinary distillation methods.

While I have stated the product of the oxidation to be ordinary products of combustion, at times where the temperatures are low and suitable conditions otherwise maintained, there is a certain amount of volatile and liquefiable oxidation products formed. Such products may be recovered from the condensed oils and from the effluent waste gases by washing with water or in other suitable ways.

What I claim is:

1. In the cracking distillation of petroleum oils, the process which comprises supplying such an oil to a tubular unobstructed chamber maintained at a temperature sufficient for cracking, supplying also sufficient air to such chamber to cause enough combustion to maintain the temperature therein, removing the vapors and gases from the chamber and condensing the vapors to recover the cracked products.

2. In the cracking distillation of petroleum oils, the process which comprises supplying such an oil to a tubular unobstructed chamber maintained at a temperature sufficient for cracking, supplying also sufficient air to such chamber at a plurality of points along its length to cause enough combustion to maintain the temperature therein, removing the vapors and gases from the chamber and condensing the vapors to recover the cracked products.

3. In the cracking distillation of petroleum oils, the process which comprises supplying such an oil to a tubular unobstructed chamber maintained at a temperature sufficient for cracking and under higher pressure than atmospheric, supplying also sufficient air to such chamber to cause enough combustion to maintain the temperature therein, removing the vapors and gases from the chamber and condensing the vapors to recover the cracked products.

4. In the cracking distillation of petroleum oils, the process which comprises establishing a cracking temperature within a cylindrical inclined unobstructed chamber, supplying oil at the one end, supplying air at a plurality of points along the length of the chamber to maintain a limited amount of combustion therein and keep up the heat, removing vapors and gases at the other end, settling out tar and carbon from such vapors and gases, cooling the mixture sufficiently to condense out any high boiling oils therein, returning the condensate to the feed end of the chamber, and cooling the residual mixture of gases and vapors to recover the cracked products.

5. In the cracking distillation of petroleum oils, the process which comprises establishing a cracking temperature and a pressure greater than atmospheric within a cylindrical inclined unobstructed chamber, supplying oil at the one end, supplying air at a plurality of points along the length of the chamber to maintain a limited amount of combustion therein and keep up the heat, removing vapors and gases at the other end, settling tar and carbon from such vapors and gases, cooling the mixture sufficiently to condense out any high boiling oils therein, returning the condensate to the feed end of the chamber, and cooling the residual mixture of gases and vapors to recover the cracked products.

In testimony whereof, I affix my signature hereto.

JAMES E. BIGGINS.